United States Patent [19]

Boudot et al.

[11] Patent Number: 4,839,314

[45] Date of Patent: Jun. 13, 1989

[54] CHEMICALLY DURABLE, HIGH INDEX, LOW DENSITY GLASSES

[75] Inventors: Jean E. Boudot; Jean P. Mazeau, both of Avon, France

[73] Assignee: Corning Glass Works, Corning, N.Y.

[21] Appl. No.: 190,839

[22] Filed: May 6, 1988

[30] Foreign Application Priority Data

Aug. 14, 1987 [FR] France .................. 87 11586

[51] Int. Cl.$^4$ .................. C03C 3/068; C03C 4/00
[52] U.S. Cl. .................. 501/78; 501/903
[58] Field of Search .................. 501/78, 903

[56] References Cited

U.S. PATENT DOCUMENTS 4,084,978 4/1978 Sagara .................. 501/78
4,390,638 6/1983 Mennemann et al. .................. 501/78

Primary Examiner—Mark L. Bell

Attorney, Agent, or Firm—Clinton S. Janes, Jr.

[57] ABSTRACT

This invention is directed to the production of glasses especially suitable for use as ophthalmic lenses which exhibit indices of refraction between about 1.699–1.703, Abbe numbers equal to or greater than 41.0, densities less than 3.25 g/cm$^3$, and good resistance to attack by acids. The glasses are essentially free of $Al_2O_3$ and consist essentially, in weight percent on the oxide basis, of:

| | | | |
|---|---|---|---|
| $SiO_2$ | 33–37 | CaO | 8–9.5 |
| $B_2O_3$ | 7.5–13 | SrO | 2–4 |
| $SiO_2 + B_2O_3$ | 44–48 | $La_2O_3$ | 12.3–14.5 |
| $Li_2O$ | 5–8 | $ZrO_2$ | 4–6 |
| $Na_2O$ | 0–2.5 | $Nb_2O_5$ | 8–10.5 |
| $K_2O$ | 0–2 | $TiO_2$ | 5–7 |
| $Li_2O + Na_2O + K_2O$ | 5–8 | $As_2O_3$ | 0–0.8 |

2 Claims, No Drawings

CHEMICALLY DURABLE, HIGH INDEX, LOW DENSITY GLASSES

BACKGROUND OF THE INVENTION

The present invention concerns optical glasses particularly useful for producing ophthalmic lenses of high power.

The use of glasses with a high index of refraction ($n_d = 1.7$) in place of conventional glasses ($n_d = 1.523$) permits an increase in the radius of curvature and, as a consequence, a reduction in the thickness of the lens. This leads to two advantages: on the one hand, the weight of the lens is much lower (however the density of the lens must not be too high, typically less than 3.25 g/cm$^3$; the conventional "flint" glass of high index containing BaO and PbO cannot be used, because of this reason) which provides better comfort for the wearer of eyeglasses, and, on the other hand, the aesthetic appearance is improved considerable. Generally, however, an increase in index leads to a decrease in the Abbe number ($v_d$); that is to say, an increase in the dispersion of the glass. If the dispersion of the glass is too high, the chromatic aberration ("iridescence" at the edges of the lens, for example) becomes significant. As a consequence, one seeks to obtain, at the same time, a low density, a high index, and a high Abbe number (generally greater than 34).

The object of this invention is to produce glasses satisfying the above-stated criteria. In particular, they exhibit an index of refraction ($n_d$) between about 1.699–1.703, an Abbe number equal to or greater than 41.0, and a density less than approximately 3.25 g/cm$^3$. Their chemical durability in an acid medium, as demonstrated in the test described later, is excellent (the loss in weight is less than about 2000 mg/dm$^2$). The transmission in the visible portion of the radiation spectrum is high (the transmission is equal to or greater than 75% at a wavelength of 400 nm and at a thickness of 10 nm), and their fabrication can be done in a continuous tank because of their good devitrification characteristics, i.e., their good resistance to devitrification.

Glasses satisfying the above-mentioned criteria of index, dispersion, and density have previously been described in U.S. Pat. No. 4,404,290 (French Pat. No. 82 12447, European Patent Application No. 99,736). More specifically, that patent concerns glasses having a typical example of the following chemical composition, expressed in weight percent on the oxide basis:

| SiO$_2$ | 19.5 | CaO | 21.05 | Nb$_2$O$_5$ | 5.9 |
| B$_2$O$_3$ | 20.9 | La$_2$O$_3$ | 12.6 | TiO$_2$ | 7.65 |
| Al$_2$O$_3$ | 8.9 | ZrO$_2$ | 3.0 | As$_2$O$_3$ | 0.5 |

But under certain conditions it could be deemed that the chemical acid durability of the glass (exhibiting a weight loss greater than 10,000 mg/dm$^2$) demands improvement, all while maintaining a $v_d$ equal to or greater than 41.0 and a density less than 3.25 g/cm$^3$.

SUMMARY OF THE INVENTION

The object of the present invention is to produce glasses which constitute an improvement with respect to the glasses of the previously cited patent. More particularly, the present invention relates to glasses useful in the production of ophthalmic lenses having an index of refraction ($n_d$) between about 1.699–1.703, an Abbe number ($v_d$) equal to or greater than 41.0, a density less than 3.25 g/cm$^3$, and good chemical durability in an acid medium, characterized in that they are essentially free of Al$_2$O$_3$ and consist essentially, in weight percent on the oxide basis, of:

| Base Range | | | |
|---|---|---|---|
| SiO$_2$ | 33–37 | CaO | 8–9.5 |
| B$_2$O$_3$ | 7.5–13 | SrO | 2–4 |
| SiO$_2$ + B$_2$O$_3$ | 44–48 | La$_2$O$_3$ | 12.3–14.5 |
| Li$_2$O | 5–8 | ZrO$_2$ | 4–6 |
| Na$_2$O | 0–2.5 | Nb$_2$O$_5$ | 8–10.5 |
| K$_2$O | 0–2 | TiO$_2$ | 5–7 |
| Li$_2$O + Na$_2$O + K$_2$O | 5–8 | As$_2$O$_3$ | 0–0.8 |
| Preferred Range | | | |
| SiO$_2$ | 33.5–35 | SrO | 2.4–3.4 |
| B$_2$O$_3$ | 9–12.5 | La$_2$O$_3$ | 12.8–14.3 |
| SiO$_2$ + B$_2$O$_3$ | 44.5–47 | ZrO$_2$ | 4.5–5.5 |
| Li$_2$O | 5.5–7.8 | Nb$_2$O$_5$ | 9–10 |
| Na$_2$O | 0–2 | TiO$_2$ | 5.5–6.5 |
| Li$_2$O + Na$_2$O | 5.5–7.8 | As$_2$O$_3$ | 0.1–0.3 |
| CaO | 8.5–9.2 | | |

Tests involving the substitution of a small portion of SiO$_2$ and B$_2$O$_3$ with Al$_2$O$_3$ indicated no advantage to be gained from the point of view of chemical durability. In fact, when 1–2% SiO$_2$ is replaced with Al$_2$O$_3$, an increase in weight loss is noted. When 1–2% B$_2$O$_3$ is replaced with Al$_2$O$_3$, no change is observed. In both cases, however, a significant white layer of chemical attack is developed.

Besides the above-stated properties, the inventive glasses exhibit a transmission of visible light (at 400 nm) equal to or greater than 75% at a thickness of 10 mm.

They also exhibit a liquidus viscosity of several dozens of poises and a very low rate of crystal growth at a viscosity of 220 poises, the same as a very low crystal density, which is very important from the manufacturing point of view.

The inventive glass compositions are the result of various compromises. To illustrate:

SiO$_2$ and B$_2$O$_3$ constitute the glass forming oxides. It was sought to minimize the content of B$_2$O$_3$ as much as possible since it rapidly deteriorates the chemical durability in an acid medium and reduces the liquidus viscosity when its content is raised to the detriment of that of SiO$_2$.

Quite high concentrations of La$_2$O$_3$ and Nb$_2$O$_5$ were chosen to be used (in order to obtain, among other things, a glass of very low dispersion $v_d \leqq 41$) because La$_2$O$_3$ exercises a favorable effect both on the index of refraction and the Abbe number, and Nb$_2$O$_5$ permits the unfavorable effect of TiO$_2$ on the Abbe number and the transmission properties of the glass to be counterbalanced. However, La$_2$O$_3$ and Nb$_2$O$_5$ rapidly increase the density and Nb$_2$O$_5$ is costly, so that their maximum proportions were fixed at 14.5% and 10.5%, respectively. ZrO$_2$ should be present at a level of at least 4% by weight in order to obtain good chemical durability (particularly in a basic medium), but not more than 6% because it unfavorably influences the devitrification and density properties.

A relatively high proportion of Li$_2$O is used in order to obtain a refractive index of at least 1.699 and also to limit the TiO$_2$ content in order to obtain an Abbe number greater than 41.0, and to limit the content of other elements having an unfavorable effect upon the density of the glass. Likewise, the presence of alkali metal oxides, and of Li$_2$O in particular, aids in obtaining good transmission properties. However, the sum of the alkali metal oxides must be held below 8% in order not to deteriorate chemical durability, in particular when the proportion of $SiO_2$ is low.

CaO and SrO serve to adjust properties of the glass.

BRIEF DESCRIPTION OF PREFERRED EMBODIMENTS

The invention is further illustrated through the non-limiting examples of Table I. The preferred example is No. 1. All of the proportions are given in weight percent.

The various constituents of the glass are provided by traditional batch materials (oxides, carbonates, nitrates, for example). The batch materials chosen will preferably contain a minimum content of transition metal oxides, particularly $Fe_2O_3$, so that the glass exhibits a good transmission at 400 nm.

After weighing, the various batch materials are mixed according to current techniques. The mixture is then placed in a platinum crucible and the crucible is introduced into a kiln operating at a temperature of about 1200° C. When the batch is completely melted, the temperature of the melt is taken to about 1325°–1400° C. for homogenization and fining. The glass melt is then cooled to the temperature corresponding to the viscosity suitable for forming and thereafter molded in the form of a bar.

The total time of the operation is on the order of 4–8 hours. After forming, the glass is annealed at about 550°–610° C. with a cooling rate of 60° C./hour; the properties are thereafter determined as described below.

The measurements of refractive index ($n_d$) and Abbe number ($\nu_d$) are carried out following the usual methods (for $n_d$, the yellow line of He is used) on the annealed samples. The density (Den.) is measured by the immersion method and is expressed in g/cm$^3$.

The chemical acid resistance (C.A.R.) is evaluated by the test which consists of determining the loss in weight of a polished sample immersed for three hours in a boiling aqueous solution containing 20% by volume HCl. The weight loss is expressed in mg/dm$^2$.

The liquidus temperature (Liq.) expressed in °C. is determined with the aid of an ADAMEL-type furnace in which the temperature is taken to about 100° C. above the liquidus temperature (holding about 10 minutes), then it is lowered and stabilized at the desired temperature (the duration of the treatment is 17 hours). The glass sample is taken out of its testing cupel; the presence of crystals is discerned through observation with an optical microscope. The growth rate of the crystals at a glass viscosity of 220 poises (Cryst.) is calculated by noting the length relationship of the crystal (from its axis to the edge) with respect to the duration of the treatment and is expressed in terms of μ/minute.

A rotational viscosimeter was utilized for determining the high temperature viscosity, including the liquid viscosity (Liq. Vis.), of the glasses expressed in terms of poises.

The transmission (Trans.) of the glass at 400 nm expressed in percent is determined on a polished sample of 10 mm thickness with the aid of a Hewlett Packard spectrophotometer (type 8450A).

TABLE I

|  | 1 | 2 | 3 | 4 | 5 |
|---|---|---|---|---|---|
| $SiO_2$ | 34.0 | 34.0 | 35.0 | 37.0 | 35.6 |
| $B_2O_3$ | 11.4 | 12.05 | 11.4 | 8.4 | 11.4 |
| $Li_2O$ | 6.2 | 5.7 | 7.8 | 7.8 | 6.2 |
| $Na_2O$ | 1.6 | 1.6 | — | — | — |
| CaO | 9.0 | 9.0 | 9.1 | 9.1 | 9.0 |
| SrO | 3.4 | 3.4 | 2.4 | 3.4 | 3.4 |
| $La_2O_3$ | 13.8 | 12.8 | 13.8 | 13.8 | 13.8 |
| $ZrO_2$ | 4.9 | 5.2 | 4.9 | 4.9 | 4.9 |
| $Nb_2O_5$ | 9.3 | 9.5 | 9.3 | 9.3 | 9.3 |
| $TiO_2$ | 6.1 | 6.45 | 6.0 | 6.0 | 6.1 |
| $As_2O_3$ | 0.3 | 0.3 | 0.3 | 0.3 | 0.3 |
| $n_d$ | 1.7018 | 1.7023 | 1.7000 | 1.7008 | 1.7013 |
| $\nu_d$ | 41.4 | 41.0 | 41.8 | 41.8 | 41.7 |
| Den. | 3.21 | 3.20 | 3.17 | 3.20 | 3.21 |
| C.A.R. | 1450 | 1560 | 1325 | 1370 | 1370 |
| Trans. | 76.5 | — | — | — | — |
| Liq. | ≅990 | — | ≅990 | ≅1010 | — |
| Liq. Vis. | ≅32 | — | — | — | — |
| Cryst. | 0.06* | — | — | — | — |

*This value compares favorably with the growth rate of crystals in glasses of previously-cited U. S. Pat. No. 4,404,290, which is equal to 0.74 μ/minute under the same conditions.

We claim:

1. Glasses useful in the production of ophthalmic lenses having an index of refraction between about 1.699–1.703, an Abbe number equal to or greater than 41.0, a density less than 3.25 g/cm$^3$, and good chemical durability in an acid medium, characterized in that they are essentially free of $Al_2O_3$ and consist essentially, expressed in terms of weight percent on the oxide basis, of:

| | | | |
|---|---|---|---|
| $SiO_2$ | 33–37 | CaO | 8–9.5 |
| $B_2O_3$ | 7.5–13 | SrO | 2–4 |
| $SiO_2 + B_2O_3$ | 44–48 | $La_2O_3$ | 12.3–14.5 |
| $Li_2O$ | 5–8 | $ZrO_2$ | 4–6 |
| $Na_2O$ | 0–2.5 | $Nb_2O_5$ | 8–10.5 |
| $K_2O$ | 0–2 | $TiO_2$ | 5–7 |
| $Li_2O + Na_2O + K_2O$ | 5–8 | $As_2O_3$ | 0–0.8. |

2. Glasses according to claim 1 characterized in that they consist essentially, expressed in terms of weight percent on the oxide basis, of:

| | | | |
|---|---|---|---|
| $SiO_2$ | 33.5–35 | SrO | 2.4–3.4 |
| $B_2O_3$ | 9–12.5 | $La_2O_3$ | 12.8–14.3 |
| $SiO_2 + B_2O_3$ | 44.5–47 | $ZrO_2$ | 4.5–5.5 |
| $Li_2O$ | 5.5–7.8 | $Nb_2O_5$ | 9–10 |
| $Na_2O$ | 0–2 | $TiO_2$ | 5.5–6.5 |
| $Li_2O + Na_2O$ | 5.5–7.8 | $As_2O_3$ | 0.1–0.3 |
| CaO | 8.5–9.2 | | |

* * * * *